Jan. 6, 1970
A. P. KYLE
3,487,644
DEVICE TO RENDER A ROCKET MOTOR NON-PROPULSIVE
BY RUPTURING THE MOTOR CASE
Filed April 26, 1968
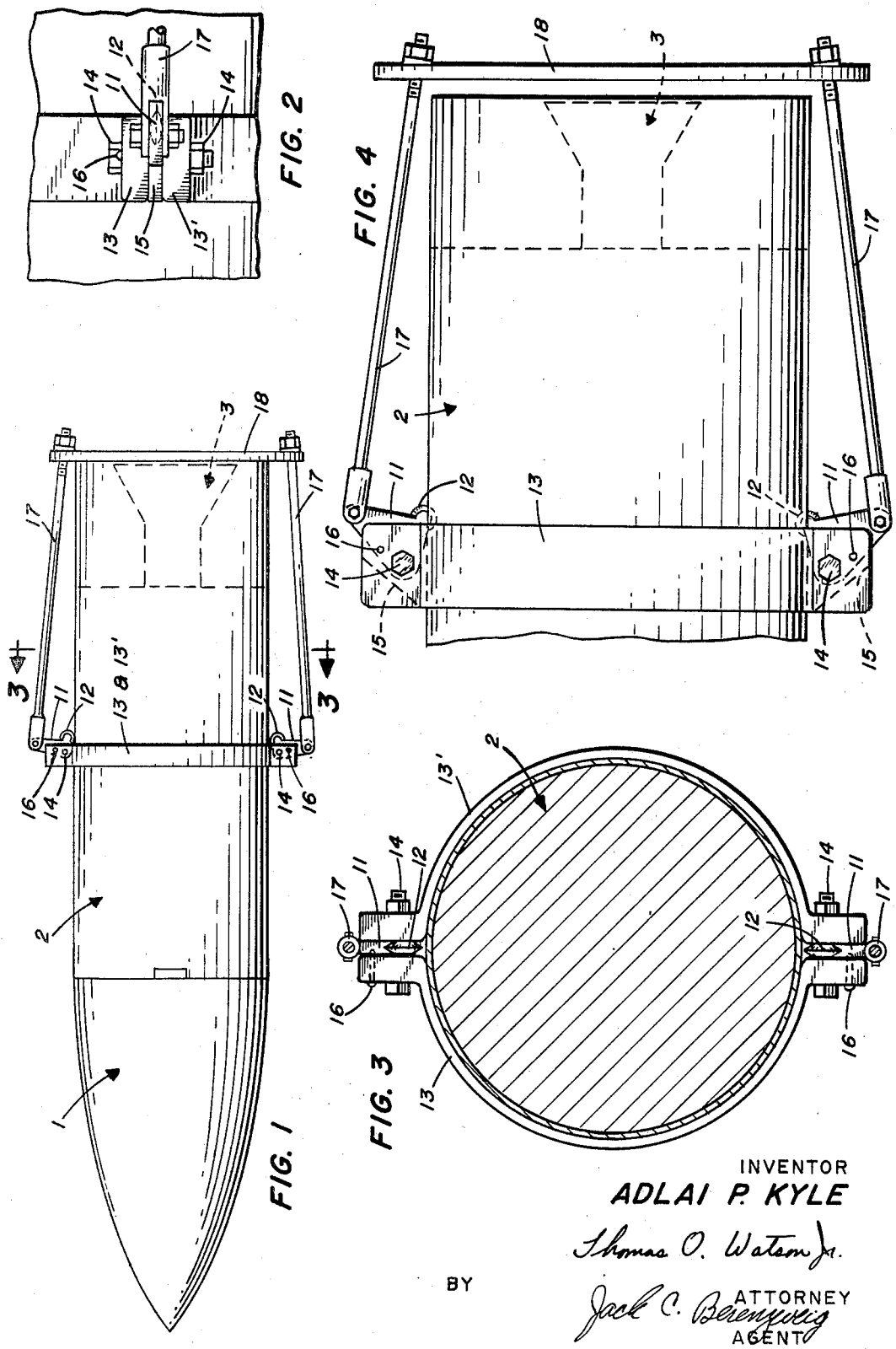
INVENTOR
ADLAI P. KYLE
Thomas O. Watson Jr.
BY
Jack C. Berenyweig
ATTORNEY
AGENT United States Patent Office 3,487,644
Patented Jan. 6, 1970

3,487,644
DEVICE TO RENDER A ROCKET MOTOR NON-PROPULSIVE BY RUPTURING THE MOTOR CASE
Adlai P. Kyle, Dahlgren, Va., assignor to the United States of America as represented by the Secretary of the Navy
Filed Apr. 26, 1968, Ser. No. 724,351
Int. Cl. F02k 9/00
U.S. Cl. 60—254          5 Claims

ABSTRACT OF THE DISCLOSURE

There is disclosed a rupture device capable of penetrating the motor casing of a rocket. When the motor is accidentally ignited, the exhaust pressure is applied to a cover plate of the rupture device which operates a linkage which then actuates two blades to sever the casing thereby preventing the rocket from flying.

STATEMENT OF GOVERNMENT INTEREST

The invention defined herein may be manufactured and used by or for the Government of the United States of America for governmental purposes without the payment of any royalties thereon or therefor.

BACKGROUND OF THE INVENTION

Field of the invention

The present invention relates generally to rocket motors and, more particularly, to a means for disabling a rocket from flying in case of an inadverent ignition while the rocket is in transit.

Description of the prior art

When rocket motors are shipped in a propulsive state they could fly from their containers in case of accidental ignition. It is the desire of the Interstate Commerce Commission to have a safety device on all rocket motors shipped propulsive. Until present there has been no such device. Rocket motors prior to this were required to be shipped in their non-propulsive state. The present invention fulfills the requirement of allowing rocket motors to be shipped in their propulsive state while being able to render it non-propulsive in case of accidental ignition.

SUMMARY OF THE INVENTION

The general purpose of this invention is to provide a device capable of rendering rocket motors non-propulsive by rupturing the motor case. To attain this, the present invention utilizes two cutting blades which upon accidental ignition of the motor, the exhaust pressure, applied to a cover plate, actuates these blades and severs the casing, thereby preventing the rocket from flying.

Accordingly, it is an object of the present invention to provide a means for preventing a rocket from flying into a trajectory after being inadvertently ignited. Another object of the present invention is to provide a means to cut open a rocket motor if unintentional ignition takes place.

A further object of the present invention is to provide a means for cutting open a rocket motor, upon inadvertent ignition, to allow its propellant force to be dissipated and thereby prevent the rocket from being launched.

Other objects, advantages and novel features of the invention will become apparent from the following detailed description of the invention when considered in conjunction with the accompanying drawings.

BRIEF DESCRIPTION OF THE DRAWINGS

FIG. 1 is a top view of the rocket, the rocket motor and the rupture device;
FIG. 2 is a partial side view of the rocket motor rupture device;
FIG. 3 is an end view along the section 3—3 of FIG. 1; and
FIG. 4 is a view similar to FIG. 1 showing the rupture device after accidental ignition.

DESCRIPTION OF THE PREFERRED EMBODIMENTS

Referring now to the drawings, wherein like reference characters designate like or corresponding parts throughout the several views, there is shown in FIG. 1 a rocket 1 having a rocket motor 2 and an exit cone 3. Attached to the rocket motor, on each side, is a cutter 11 having a cutting edge 12 mounted between two semi-circular bands 13 and 13' that fit circumferentially around the base of motor 2. The bands are secured by two bolts 14 which also provide the pivot for the cutters. Two cylindrical spacers 15, placed between the circular bands, as shown in FIG. 2, are provided to prevent the bands from being drawn up so tight as to bind the cutters. Each cutter has a shear pin 16 which allows the cover plate to be drawn securely to the nozzle, yet hold the cutter away from the motor case. Attached to each cutter is a connecting rod 17 which in turn is linked to a cover plate 18 which in turn is fitted over the exit cone 3 of the rocket motor.

FIG. 2 is a side view of FIG. 1 showing one-half of the rupture device in more detail. The rupture device consists of a boot-shaped cutter 11 having a hardened semi-circularly shaped steel blade 12. An ideal blade would be approximately one-quarter inch thick. The toe portion of each blade is ground to a sharp edge so that it will penetrate the motor case when the device is operated. As explained previously, the cutter is mounted between two semi-circular bands 13 that fit around the motor case. Bolt 14 secures these bands and also provides a pivot for the cutters. A cylindrical spacer 15 is provided to prevent the bands from being drawn up so tight as to bind the cutters.

FIG. 3 is an end view of the rocket in FIG. 1, along the section 3—3, showing the circular bands 13 and 13' on either side of the motor.

Referring now to FIG. 4, if the motor is ignited, the exhaust pressure applied to cover plate 18 from exit cone 3 will displace the cover plate and impart a linear motion to connecting rod 17. This motion will be transmitted to shear pin 16. As the exhaust pressure increases connecting rod 17 will shear the pins 16, on each side of the rocket, and the cutters will then rotate, causing the cutter blades 12 to cut into the motor case causing the case to rupture. Rupturing the motor casing prevents the missile from flying into a trajectory after being inadvertently ignited and allows the propellant force to be dissipated. An additional benefit of the device is that cover plate 18 acts as a nozzle cover for its motor and will therefore prevent the entrance of flame and heat in the event of a common fire or the accidental ignition of another motor of another rocket.

From the foregoing, it is evident that a missile cutting means has been devised for preventing a missile from flying into a trajectory and possibly creating an incident after being inadvertently ignited while in transit, the missile cutting means additionally being simple and easy to manufacture, inexpensive and easy to install.

Obviously many modifications and variations of the present invention are possible in light of the above teachings.

What is claimed is:
1. A rocket motor rupture device in combination with a rocket motor to render the motor non-propulsive by rupturing the motor case comprising:
   cutting means;
   means to secure said cutting means against said motor casing;
   a motor nozzle cover plate; and
   linkage means connecting said cover plate to said cutting means wherein upon inadvertent ignition of the motor, the exhaust pressure from said motor nozzle will impart a motion to said cover plate which moves the cutting means against the motor casing with sufficient force to sever said casing and render the motor non-propulsive.

2. A rocket motor rupture device as in claim 1, wherein said cutting means comprises two cutters, each having a hardened cutting edge.

3. A rocket motor rupture device as in claim 2, wherein said means to secure said cutting means against the motor casing comprises:
   two semi-circular bands pivotally attached to said two cutting means so as to form a circular band around said rocket motor; and
   a shear pin fixedly associated with each cutting means to hold said cutting blade against said casing.

4. A rocket motor rupture device as in claim 3 wherein upon inadvertent ignition of the motor, said linking means severs said shear pins causing said cutting means to sever said casing.

5. A rocket motor rupture device as in claim 4 wherein said cutting edges are semi-circular in shape and formed from hardened steel.

References Cited

UNITED STATES PATENTS

| | | | |
|---|---|---|---|
| 3,038,303 | 6/1962 | Gose | 60—223 XR |
| 3,167,910 | 2/1965 | Weaver | 60—254 XR |
| 3,295,324 | 1/1967 | Conrad et al. | 60—254 |

CARLTON R. CROYLE, Primary Examiner

U.S. Cl. X.R.

60—271